No. 73,485.  S. ADAMS.  WINNOWING MILL.  PATENTED JAN. 21, 1868.
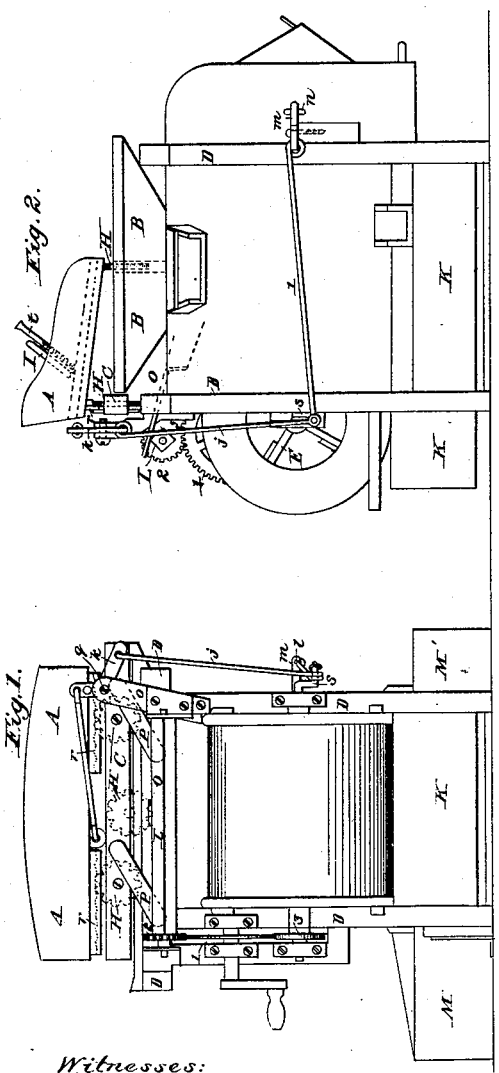
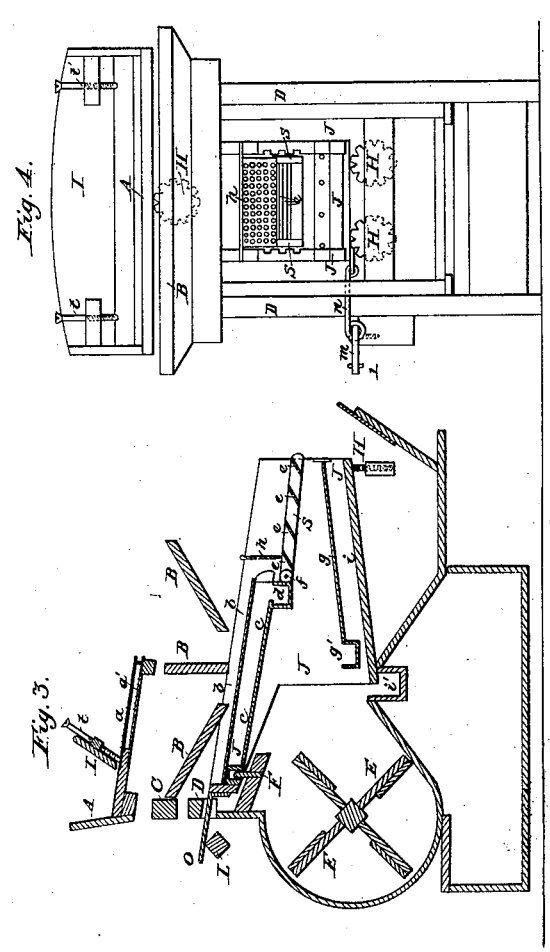
Witnesses:  Inventor:

United States Patent Office.

SANFORD ADAMS, OF BOSTON, MASSACHUSETTS.

Letters Patent No. 78,485, dated January 21, 1868.

IMPROVEMENT IN WINNOWING-MILLS.

*The Schedule referred to in these Letters Patent and making part of the same.*

TO ALL WHOM IT MAY CONCERN:

Be it known that I, SANFORD ADAMS, of Boston, in the county of Suffolk, in the State of Massachusetts, have invented new and useful Improvements in Winnowing-Mills or Grain-Separators; and I do hereby declare that the following is a full and exact description thereof, reference being had to the accompanying drawings, and to the letters of reference marked thereon, in which—

Figure 1 is a rear end elevation,
Figure 2 a side elevation,
Figure 3 a vertical longitudinal section through the centre of the winnower.
Figure 4 is a rear end elevation.

Like letters represent like parts in all the figures.

The nature of my invention consists in giving to the shoe or frame that holds the screens, such a motion as will more readily cause seeds of a certain class to pass through the screens, while other seeds will pass over the sieves or screens. Also, in notching or fluting the rollers, on which the feeding-hopper and the shoe vibrate, to give the screens a jarring motion to keep them from clogging. Also, in arranging the trap, under which the grain is fed into the machine, in such a manner that the amount of grain fed into the winnower can be easily and surely adjusted. Also, in arranging slats at the rear end of the winnower, in such a manner that the grain will be caught by them and saved, while the chaff is allowed to escape freely.

In the accompanying drawings, A is the feed-hopper; B B are the compartments, into which the grain first comes from the hopper A; C is the beam, in which notched rollers, H H, are placed, upon which the hopper A vibrates; P P are pieces, which are pivoted to the beam C and the frame D, by means of which pieces the beam C can be raised or lowered; E is the fan; F is a post or pivot, upon which the shoe J swings, (seen in fig. 3;) I is the trap for regulating the feed, and is held in position by screws $t$; K is a drawer, under the winnower, in which the extra screws are kept; L is a square shaft, driven by the gear 2, cogging into gear 1, over and upon which shaft the spring O rests; S S are longitudinal slats, turning upon the pivots $ff$, figs. 3 and 4. The cross-slats $e\ e\ e\ e$ are fastened rigidly into the longitudinal slats S S; $a\ a$ are screens, in the hopper A, seen in fig. 3; $b$ and $g$ are screens, in the shoe J; $c$ and $i$ are boards, along which the grain passes into the conductors $d$ and $i'$; $g'$ is a conductor from the screen $g$; $s$, figs. 1 and 2, is a crank, from which rods $j$ and $l$ pass to the angle-irons or knees, $k$ and $m$. A wire passes from the angle-iron $k$ to the hopper A, as seen in fig. 1, and another wire, $n$, seen in figs. 2 and 4, passes from the angle-iron $m$ to the shoe J, and communicates a vibratory motion to it. The rolls H H, in the beam C, figs. 1 and 2, are constructed with a groove, into which the piece or track $r$ fits, guiding the hopper A as it vibrates. The part of the rolls H H, upon which the hopper rests, is cogged or notched. The forward part of the hopper also rests on a notched roller, placed in the wood-work B, fig. 2. Rollers H H are also notched, and placed under the rear end of the shoe J, for the shoe to vibrate upon, seen in figs. 4 and 3. $h$ is a screen to conduct the grain down on to the slats $e\ e\ e$.

Operation.

By turning the crank of the mill, all the parts are set in motion. The hopper A is made to roll back and forwards on the rolls H, by means of the parts connecting the hopper to the crank $s$. The rolls H, being notched or fluted, a jarring motion is given to the hopper, as it rolls over them, keeping the screens of the hopper clear and free. By means of the screws $t\ t$, the trap I can easily be raised or lowered to feed the grain, to any required quantity, and there is no danger of the trap moving, as it might if held by friction only, as the common method. The grain passes over the two screens $a\ a$, in the hopper, fig. 3, and then down on to in the screens in the shoe J. The shoe J swings on the post F, at one end, and rolls on the rolls H H, at the other end, seen in fig. 3, being moved on the rolls by connections $n$, $m$, and $l$, with the crank $s$. The rolls H H here are also notched or fluted, as seen in fig. 4, and give a jarring motion, in addition to the side motion, to the shoe J, as it vibrates, which jarring motion tends to jump out any seeds that catch in the screens.

In all winnowers of the usual construction, there is but very little effectual motion at the pivoted end of the shoe or frame that contains the screens, which makes them very liable to clog at this point. To overcome this difficulty I employ the device of the spring O and square shaft L. The spring O is attached to the rear end of the shoe J, and passes over and rests upon the square shaft L, which is constantly revolving. Thus the spring O, and with it the rear end of the shoe J, is kept tumbling up and down by the angles of the shaft L, and this keeps the screens from clogging, and also jumps up long slender seeds in such a manner that they will pass through a very fine sieve, and can be separated from the other seeds. Daisy-seed is of this class, and without this up-and-down motion, in addition to the side motion of the screens, it cannot be separated from the grass-seed.

The grain passes over and through the various screens into the conductors, and out on the sides of the mill into boxes M M'. The slats e e e e are fastened rigidly into the side pieces S S, which turn on pivots f. The slats can easily be raised or lowered to catch the grain and keep it from escaping with the chaff.

What I claim as my invention, and desire to secure by Letters Patent, is—

1. I claim the fluted rolls H, for either the hopper A or shoe J to vibrate upon, substantially as described and for the purpose set forth.

2. The shaft L and spring O, arranged substantially as described, to give an additional motion to the pivoted end of the shoe J, substantially as and for the purposes set forth.

3. The slats e e e, fastened on to the sides S S, both swinging from the pivots f, substantially as and for the purpose set forth.

4. The combination of the hopper A, slide 1, and screw t, as and for the purpose set forth.

SANFORD ADAMS.

Witnesses:
   JAMES W. BROWN,
   A. S. NICHOLS.